*(12)* United States Patent
Wang et al.

(10) Patent No.: US 8,022,929 B2
(45) Date of Patent: Sep. 20, 2011

(54) POINTING DEVICE FOR ELECTRONIC EQUIPMENT

(75) Inventors: Shih-Yang Wang, Taipei (TW); Chia-Yuan Liu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 948 days.

(21) Appl. No.: 11/984,343

(22) Filed: Nov. 16, 2007

(65) Prior Publication Data

US 2009/0066642 A1    Mar. 12, 2009

(30) Foreign Application Priority Data

Sep. 6, 2007  (TW) .............................. 96133243 A

(51) Int. Cl.
*G06F 3/033* (2006.01)
(52) U.S. Cl. ........................................................ 345/161
(58) Field of Classification Search .................. 345/157, 345/161; 463/38; 74/471
See application file for complete search history.

(56) References Cited

U.S. PATENT DOCUMENTS

| | | | |
|---|---|---|---|
| 6,433,777 B1* | 8/2002 | Sawyer | 345/161 |
| 6,920,041 B2* | 7/2005 | Oross et al. | 361/679.06 |
| 6,987,508 B2* | 1/2006 | Numata et al. | 345/184 |
| 7,728,814 B1* | 6/2010 | Ansari et al. | 345/161 |
| 2005/0190153 A1* | 9/2005 | Ushimaru et al. | 345/161 |
| 2007/0273643 A1* | 11/2007 | Erez et al. | 345/156 |

* cited by examiner

*Primary Examiner* — Chanh Nguyen
*Assistant Examiner* — John C Kirkpatrick
(74) *Attorney, Agent, or Firm* — Rosenberg, Klein & Lee

(57) ABSTRACT

In a pointing device for electronic equipment, the equipment includes a casing and a receiving space defined by the casing, and the pointing device includes a sensor unit, a column, and a joystick. The sensor unit is disposed in the receiving space. The column is disposed on the sensor unit, and is swingable relative to the sensor unit. The sensor unit is used to detect swinging state of the column. The joystick is mounted on the column, and is movable relative to the column between first and second positions. The joystick projects from an outer surface of the casing when at the first position, and is accommodated in the receiving space when at the second position. Thus, the joystick can be accommodated in the receiving space to avoid inadvertent actuation so as to enhance the convenience of carrying the electronic equipment.

8 Claims, 10 Drawing Sheets

POINTING DEVICE FOR ELECTRONIC EQUIPMENT

CROSS-REFERENCE TO RELATED APPLICATION

This application claims priority of Taiwanese Application No. 096133243, filed on Sep. 6, 2007.

BACKGROUND OF THE INVENTION

1. Field of the Invention

The invention relates to a pointing device for electronic equipment, more particularly to a pointing device for controlling movement of a cursor.

2. Description of the Related Art

Conventional pointing devices for use in portable electronic equipment, such as a notebook computer, an ultra mobile personal computer (UMPC), a personal digital assistant (PDA), and a global positioning system (GPS), can be generally classified into touch screens, touch pads, track balls, pointing sticks, etc.

However, the aforesaid conventional pointing devices have their respective drawbacks in application. For instance, touch screens are relatively costly, and are quite inconvenient to use if the user wants to make an input via keys or buttons since the user needs to operate the keys or buttons and a stylus interchangeably. Touch pads and track balls occupy a relatively large amount of space in application, and are therefore not suitable for use in relatively small electronic equipment, such as UMPCs, PDAs, and GPSs.

Pointing sticks can overcome the drawbacks associated with the aforesaid pointing devices. However, since a pointing stick generally stick out from the cuter surface of the electronic equipment for operation by the user and cannot be stowed within the electronic equipment, when the electronic equipment is being carried around by the user, the protruding pointing stick may undesirably catch other objects, thus rendering carrying of the electronic equipment inconvenient. Inadvertent actuation of the electronic equipment may also result. In addition, the pointing stick generally requires the arrangement of a button to perform switching between a cursor mode and a scroll mode to enable the pointing stick to scroll web pages by moving up and down under the scroll mode. Such switching actions render the operation of the pointing stick inconvenient.

SUMMARY OF THE INVENTION

Therefore, an object of the present invention is to provide a pointing device for electronic equipment, which includes a joystick that can be accommodated in a receiving space so as to avoid inadvertent actuation of the joystick, thereby enhancing the convenience of carrying the electronic equipment.

Another object of the present invention is to provide a pointing device for electronic equipment, which includes a joystick that can be operated to bring a column to rotate relative to a base so as to permit input in another dimension.

Other objects and advantages of the present invention can be further appreciated from the technical features disclosed in the present invention.

In order to achieve one or a part or all of the aforesaid objects or other objects, according to a technical feature of the pointing device for electronic equipment disclosed in the preferred embodiments, the electronic equipment includes a casing and a receiving space defined by the casing. The pointing device includes a sensor unit, a column, and a joystick.

The sensor unit is disposed in the receiving space. The column is disposed on the sensor unit, and is swingable relative to the sensor unit. The sensor unit is provided to detect swinging state of the column. The joystick is mounted on the column, and is movable relative to the column between first and second positions such that the joystick is adapted to project from an outer surface of the casing when at the first position and is adapted to be accommodated in the receiving space when at the second position.

In an embodiment of this invention, the first position is a relatively high limit position, and the second position is a relatively low limit position. When the joystick is moved downward from the first position to the second position, the joystick will simultaneously rotate relative to the column about a central axis thereof, and when the joystick is moved upward from the second position to the first position, the joystick will simultaneously rotate relative to the column about the central axis thereof.

In an embodiment of this invention, the pointing device further includes a resilient element for providing a restoration force to restore the joystick from the second position to the first position.

In an embodiment of this invention, the column includes a plurality of axially extending ribs angularly spaced apart on an outer surface thereof, a plurality of limiting recesses defined respectively by bottom ends of the ribs, and a plurality of axially extending guide grooves. Each of the guide grooves is formed between an adjacent pair of the ribs. The joystick is a hollow socket fitted on the column, and includes a plurality of limiting elements angularly spaced apart on an inner surface of the joystick. The resilient element is in the form of a compression spring that is disposed within the joystick and that has two ends respectively abutting against a top face of the column and the joystick. The limiting elements are retained respectively in the guide grooves when the joystick is at the first position. The limiting elements are retained respectively in the limiting recesses when the joystick is at the second position.

In an embodiment of this invention, the first position is a relatively low limit position, and the second position is a relatively high limit position. When the joystick is moved upward from the first position to the second position, the joystick will simultaneously rotate relative to the column about a central axis thereof, and when the joystick is moved downward from the second position to the first position, the joystick will simultaneously rotate relative to the column about the central axis thereof.

In an embodiment of this invention, the pointing device further includes a resilient element for providing a restoration force to restore the joystick from the first position to the second position.

In an embodiment of this invention, the column is hollow, and includes a plurality of axially extending ribs angularly spaced apart on an inner surface thereof, a plurality of limiting recesses defined respectively by bottom ends of the ribs, and a plurality of axially extending guide grooves. Each of the guide grooves is formed between an adjacent pair of the ribs. The joystick extends into the column, and includes a plurality of limiting elements angularly spaced apart on an outer surface thereof. The resilient element is in the form of a compression spring that is disposed in the column and that has two ends respectively abutting against the joystick and the sensor unit. The limiting elements are retained respectively in the limiting recesses when the joystick is at the first position, and such that the limiting elements are retained respectively in the guide grooves when the joystick is at the second position.

In an embodiment of this invention, the joystick includes a mounting seat and a rod connected pivotally to a top end of the mounting seat. The limiting elements are disposed on an outer surface of the mounting seat. The mounting seat has a connecting member provided on the top end for pivotal connection with a bottom end of the rod. The connecting member of the mounting seat is accommodated within the column, and the rod is coaxial with the column when the joystick is at the first position. The connecting member of the mounting seat is exposed from a top end of the column when the joystick is at the second position such that the rod is pivotable relative to the mounting seat and is at an angle with the column so as to be adapted to be accommodated in the receiving space.

In an embodiment of this invention, the sensor unit includes a base for mounting of the column and for detecting the swinging state of the column. The joystick brings the column to rotate relative to the base about a central axis thereof when the joystick is at the first position. The base includes a pivot pin provided on a top face thereof for mounting of the column. The column is rotatable relative to the pivot pin about the central axis thereof. The sensor unit further includes an optical gating fitted on an outer surface of the column, and a photo interrupter for detecting rotational state of the optical gating such that, when the joystick brings the column to rotate relative to the base about the central axis, the optical gating is rotatable with the column, and the photo interrupter detects the rotational state of the optical gating.

In the pointing device for electronic equipment as disclosed in the embodiments according to this invention, since the joystick is movable between the first and second positions, the joystick is ready for operation by the user when at the first position, and is accommodated in the receiving space when at the second position. Thus, the user will not inadvertently actuate the joystick when carrying the electronic equipment, thereby enhancing the convenience of carrying the electronic equipment. In addition, since the joystick is rotatable to bring the column to rotate relative to the base, the pointing device permits input in an additional dimension.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
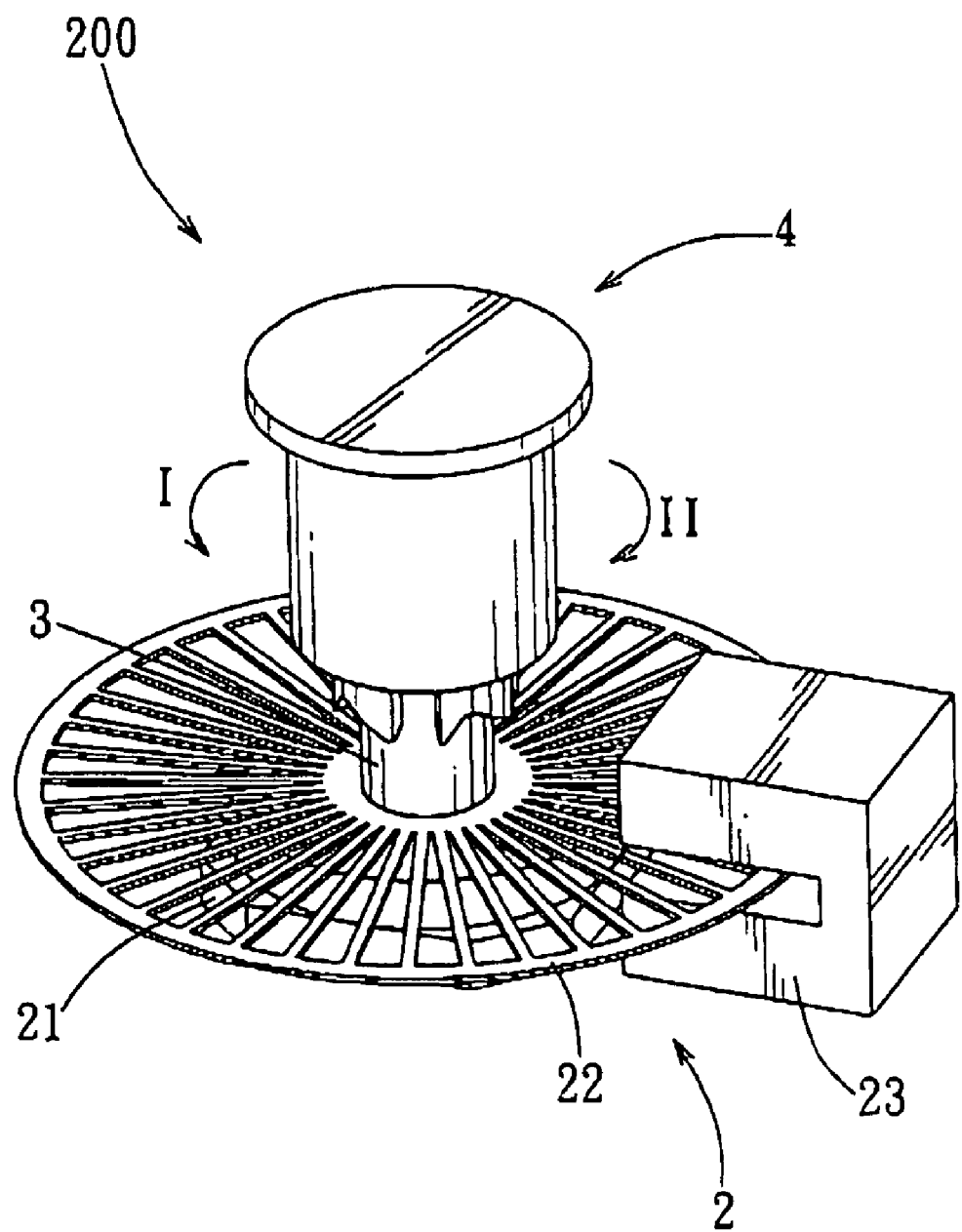
FIG. 1 is a perspective view of the first preferred embodiment of a pointing device for electronic equipment according to the present invention.

Before the present invention is described in greater detail, it should be noted that like elements are denoted by the same reference numerals throughout the disclosure.

It is noted here in that, in the following description, directional phrases, such a stop, bottom, left, and right, are defined in relation to the drawings, and are intended to facilitate description of the present invention rather than to limit the scope of the present invention.

Referring to FIG. 1, the first preferred embodiment of a pointing device 200 for electronic equipment according to the present invention is adapted to control movement and position of a cursor (not shown) on a display screen of the electronic equipment. The electronic equipment may be portable electronic equipment, such as a notebook computer, a UMPC, a PDA, and a GPS, or other electronic equipment, such as a keyboard.

Figure 2:
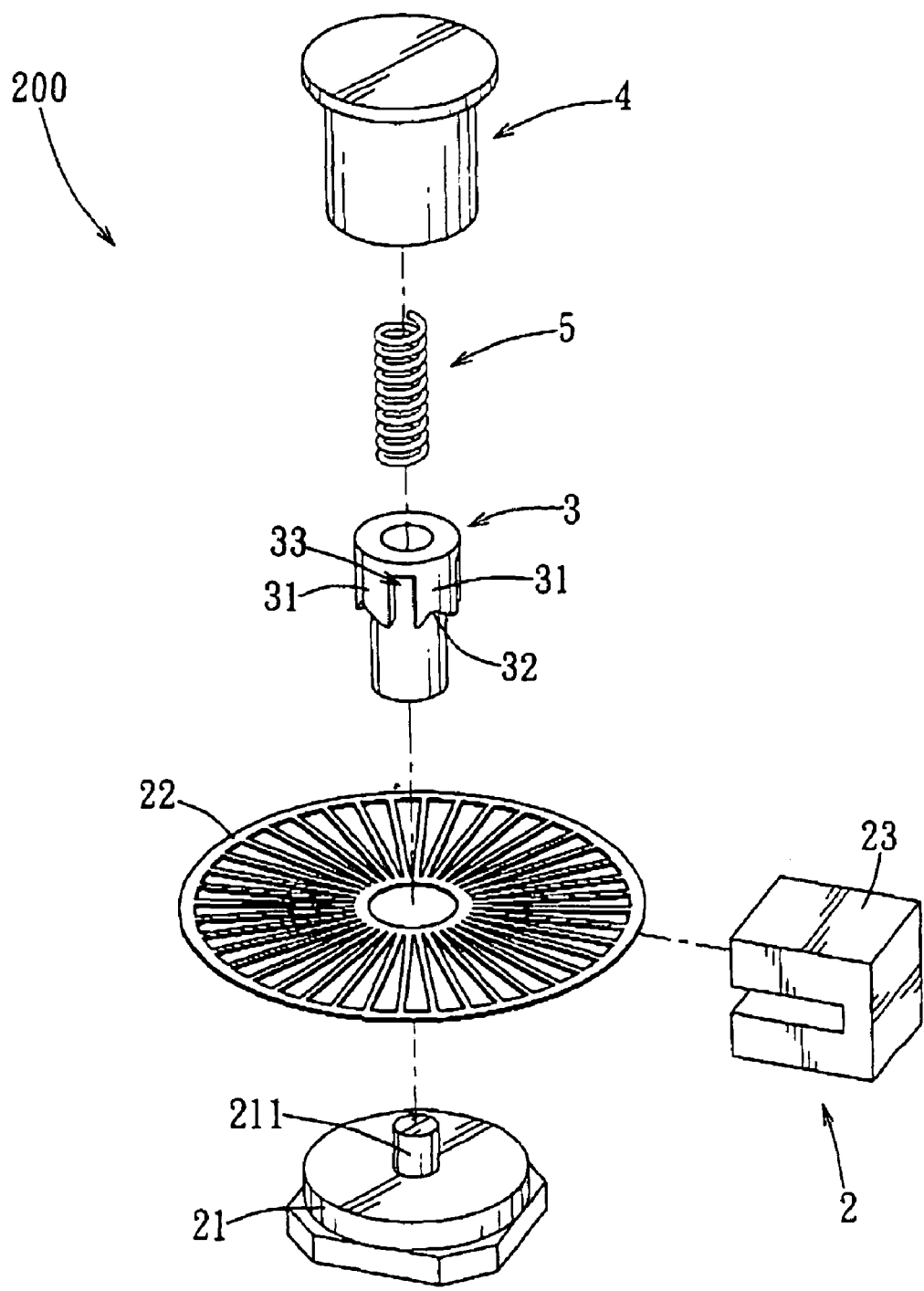
FIG. 2 is an exploded perspective view of the first preferred embodiment to illustrate assembly relationship among a sensor unit, a column, a joystick, and a resilient element.
Figure 3:
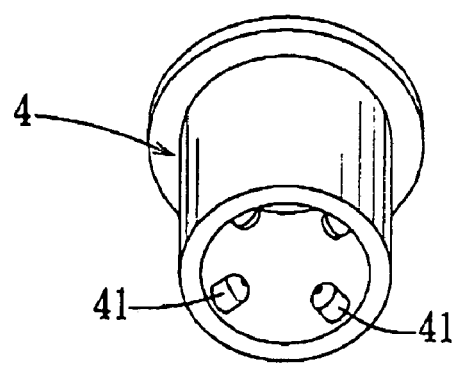
FIG. 3 is a perspective view of the joystick of the first preferred embodiment.
Figure 4:
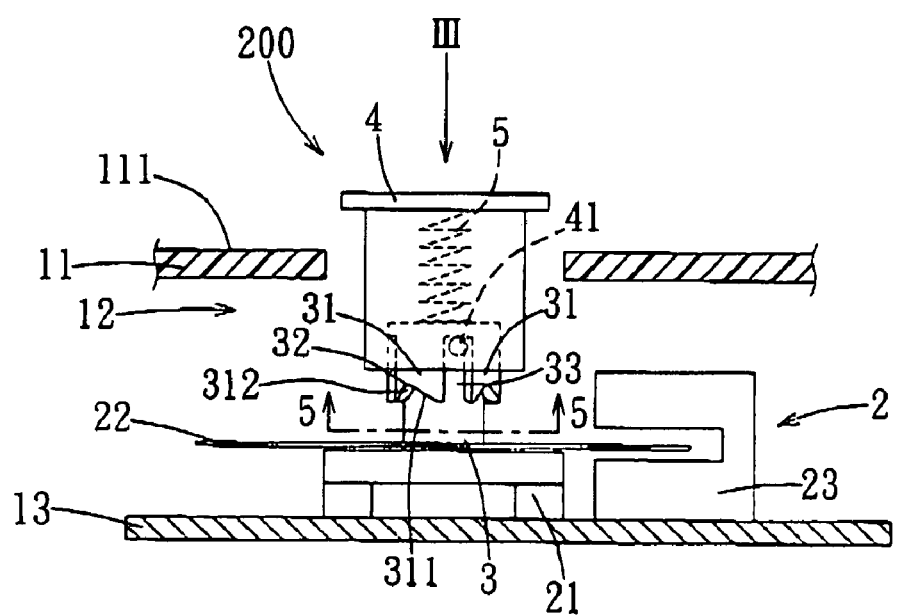
FIG. 4 is a side view of the first preferred embodiment mounted in a receiving space of the electronic equipment, illustrating the joystick at a first position relative to the column.

Referring to FIGS. 2, 3 and 4, the electronic equipment is shown to include a casing 11, and a receiving space 12 defined by the casing 11 for accommodating the pointing device 200. The pointing device 200 includes a sensor unit 2, a column 3, a joystick 4, and a resilient element 5. The sensor unit 2 includes a base 21 provided on and connected electrically to a circuit board 13 of the electronic equipment. The column 3 is fitted on a pivot pin 211 on a top face of the base 21, is swingable in any direction relative to the base 21, and is rotatable about a central axis thereof relative to the pivot pin 211 of the base 21. The base 21 can detect the direction of swinging of the column 3. The sensor unit 2 further includes an optical gating 22 fitted on an outer surface of the column 3 and rotatable with the column 3, and a photo interrupter 23 disposed on the circuit board 13 for detecting rotational state (e.g., angle or speed of rotation) of the optical gating 22.

The column 3 is cylindrical in shape, and includes a plurality of axially extending elongated ribs 31 that are angularly spaced apart on an outer surface thereof, a plurality of limiting recesses 32 defined respectively by bottom ends of the ribs 31, and a plurality of axially extending elongated guide grooves 33. Each guide groove 33 is formed between an adjacent pair of the ribs 31. The joystick 4 is in the form of a hollow socket, and is fitted on the column 3. The joystick 4 includes a plurality of limiting elements 41 that are angularly spaced apart on an inner surface thereof, that are adjacent to a bottom end of the joystick 4, and that are in the form of studs. The number of the limiting elements 41 is the same as the number of the limiting recesses 32 or the guide grooves 33. Each of the limiting elements 41 is retained in a corresponding one of the limiting recesses 32 and the guide grooves 33. In this embodiment, there are four limiting elements 41. However, the limiting elements 41, the limiting recesses 32, and the guide grooves 33 may be two or more than two in number, and should not be limited to the disclosure in this embodiment.

The resilient element 5 is disposed within the joystick 4, and is in the form of a compression spring having two ends respectively abutting against a top face of the column 3 and the joystick 4.

Figure 5:
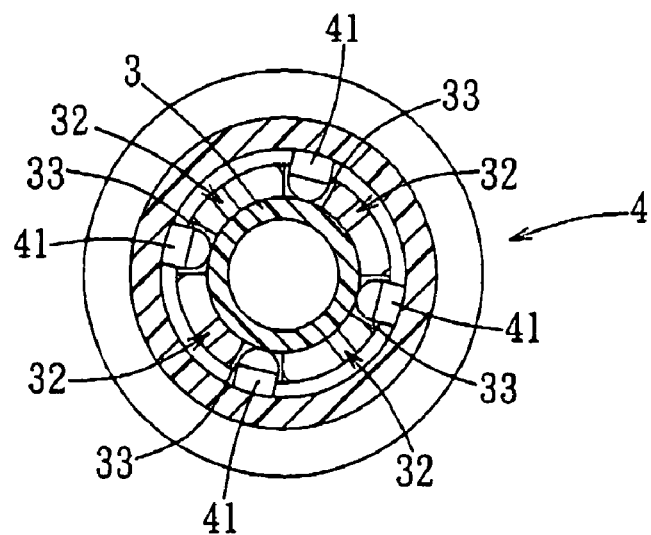
FIG. 5 is a sectional view taken along line 5-5 of FIG. 4, illustrating how limiting elements of the joystick are retained in guide grooves in the column.
Figure 6:
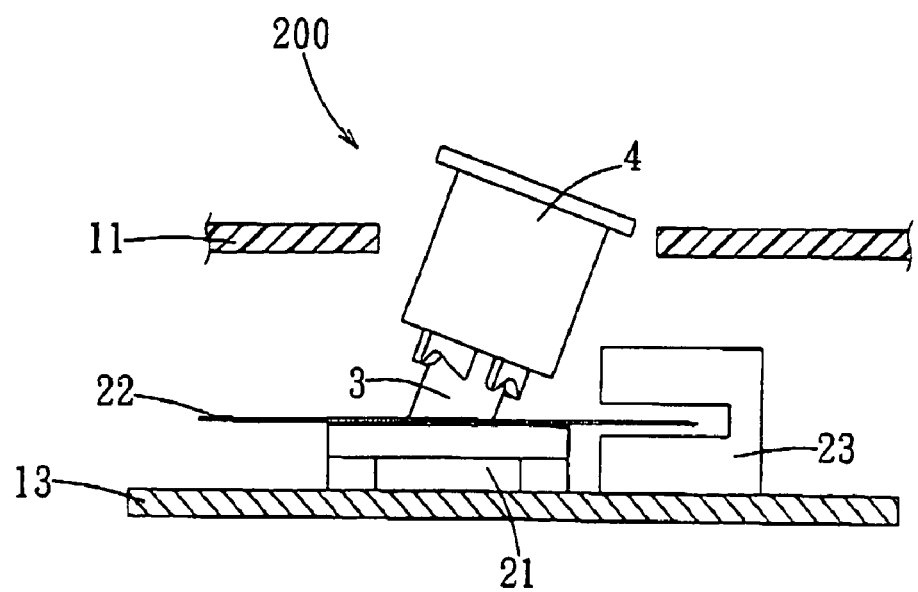
FIG. 6 is a side view of the first preferred embodiment mounted in the receiving space of the electronic equipment, illustrating the joystick at the first position relative to the column and how the joystick brings the column to swing relative to a base in any specific direction.

As shown in FIGS. 4 and 5, the joystick 4 is movable between a first position (see FIG. 4) and a second position (see FIG. 7) relative to the column 3. When the joystick 4 is at the first position, the joystick 4 projects from an outer surface 111 of the casing 11, and the limiting elements 41 of the joystick 4 are retained respectively in the guide grooves 33 in the column 3. In this state, the joystick 4 is located at a relatively high limit position, which is a position of use, ready for operation by the user. The user can manipulate the joystick 4 with his/her finger to swine the joystick 4 in any specific direction. The joystick 4 will bring the column 3 to swing relative to the base 21 of the sensor unit 2 as illustrated in FIG. 6. A sensor element (not shown) is disposed within the base 21 of the sensor unit 2 to detect the swinging direction of the column 3 and to transmit electric signals obtained from the detection to the circuit board 13. Thus, the user can control the movement and position of the cursor or the display screen of the electronic equipment by the swinging of the joystick 4. Since the detection of the swinging of the column 3 is known in the art and is not a crucial feature of the present invention, it will not be described in detail herein for the sake of brevity.

Furthermore, two buttons (not shown) can be provided or the casing 11 of the electronic equipment at one side of the pointing device 200 to simulate left and right buttons of a conventional mouse (not shown). It is noted that FIG. 6 shows the state of the joystick 4 after being swung in a specific direction. The joystick 4 of this embodiment may be swung in other directions as well, without being limited to the disclosure in FIG. 6.

In addition, when the joystick 4 is at the first position, the user can cause the column 3 to rotate relative to the pivot pin 221 of the base 21 in a direction indicated by arrow I (as shown in FIG. 1) or arrow II (as shown in FIG. 1) through rotating the joystick 4, so that the column 3 brings the optical gating 22 to rotate therewith. Due to the photo interrupter 23 that detects the rotational state of the optical gating 22, scroll bars (not shown) on a web page can be controlled to move up or down like using a roller wheel (not shown) of the conventional mouse, or movement or positioning along a Z-axis direction in 3D software can be controlled, thereby permitting input in another dimension using the pointing device 200.

However, the function achievable with the rotation of the joystick 4 can vary with different application software, and should not be limited to the disclosure in this embodiment.

Figure 7:
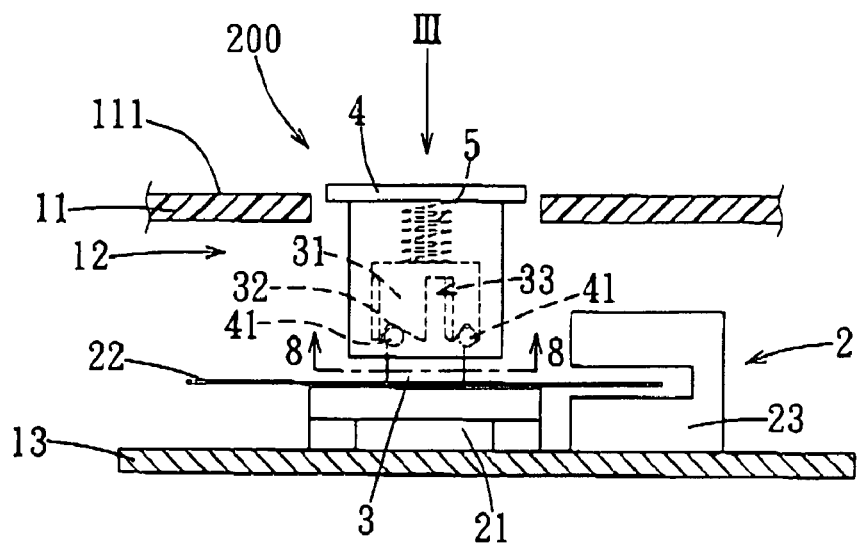
FIG. 7 is a side view of the first preferred embodiment mounted in the receiving space of the electronic equipment, illustrating the joystick at a second position relative to the column and accommodated in the receiving space.
Figure 8:
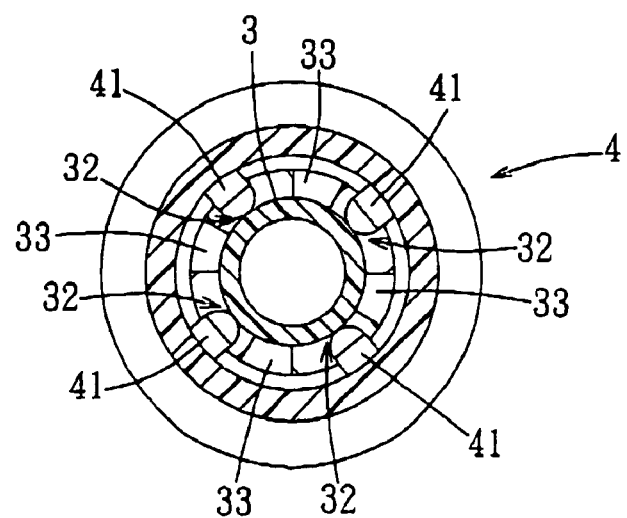
FIG. 8 is a sectional view taken along line 8-8 of FIG. 7, illustrating how the limiting elements of the joystick are retained in limiting recesses in the column.

As shown in FIGS. 4, 7 and 8, when the joystick 4 is pressed by the user to move downwardly in a direction indicated by arrow III, the limiting elements 41 of the joystick 4 will move downward along the respective guide grooves 33, and the joystick 4 will compress the resilient element 5 to cause the latter to deform. When the limiting elements 41 are moved respectively to bottom ends of the guide grooves 33, since a first ramp 311 at the bottom end of each rib 31 slopes toward the bottom end of the respective guide groove 33 and due to the restoration force of the resilient element 5 and the guiding of the first ramp 311, upon release of the pressure on the joystick 4 by the user, the limiting elements 41 of the joystick 4 are forced to slide into the limiting recesses 32 along the first ramps 311, and the joystick 4 is simultaneously rotated an angle relative to the column 3 in the direction indicated by arrow II (see FIG. 1) about the central axis thereof. At this point, the joystick 4 is moved from the first position to the second position relative to the column 3. Since the second position is a relatively low limit position, when the joystick 4 is at the second position, the joystick 4 will be accommodated in the receiving space 12. Thus, the joystick 4 will not be inadvertently actuated when the user is carrying the electronic equipment around, thereby enhancing the convenience of carrying the electronic device.

Since a top end of the joystick 4 protrudes slightly from the outer surface 111 of the casing 11 when at the second position, if the user wants to operate the joystick 4, the top end of the joystick 4 can be pressed directly to cause the joystick 4 to move downward in the direction indicated by arrow III, such that each of the limiting elements 41 of the joystick 4 slides along a second ramp 312 at the bottom end of the respective rib 31 to be guided to the bottom end of an adjacent one of the guide grooves 33. Thereafter, when the user releases the pressure on the joystick 4, the restoration force of the resilient element 5 will force the joystick 4 to rebound to the first position. Thus, each of the limiting elements 41 of the joystick 4 is retained in one of the guide grooves 33, and the joystick 4 is simultaneously rotated another angle relative to the column in the direction indicated by arrow II (see FIG. 1) about the central axis thereof. The joystick 4 is therefore restored to the state ready for operation by the user.

Figure 9:
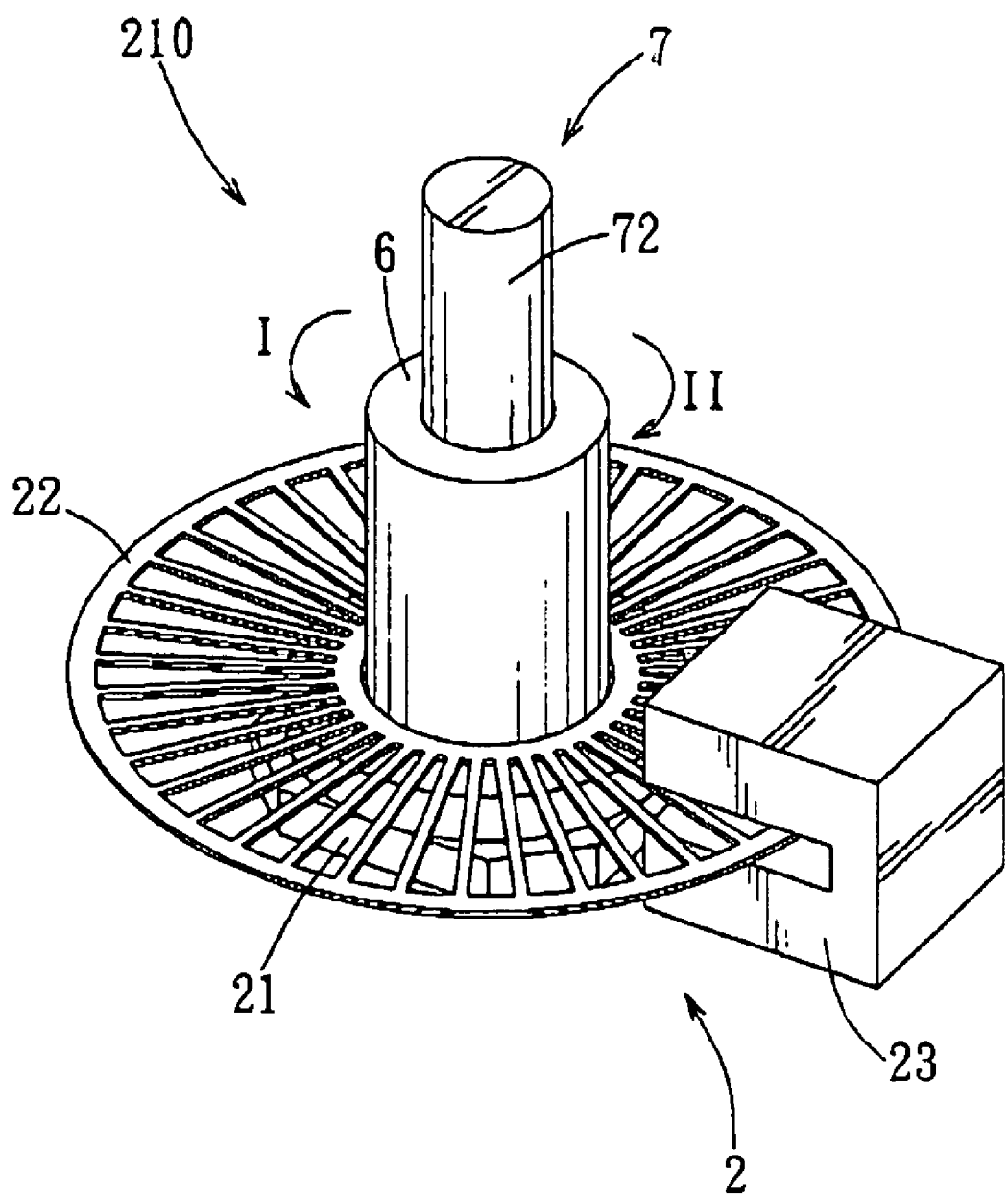
FIG. 9 is a perspective view of the second preferred embodiment of a pointing device for electronic equipment according to the present invention.

FIG. 9 illustrates the second preferred embodiment of a pointing device 210 for electronic equipment according to the present invention. The pointing device 210 is substantially similar to the pointing device 200 in structure, but with a column 6 and a joystick 7 that are different from those of the first preferred embodiment in design. The way the joystick 7 is stowed is different as well.

Figure 10:
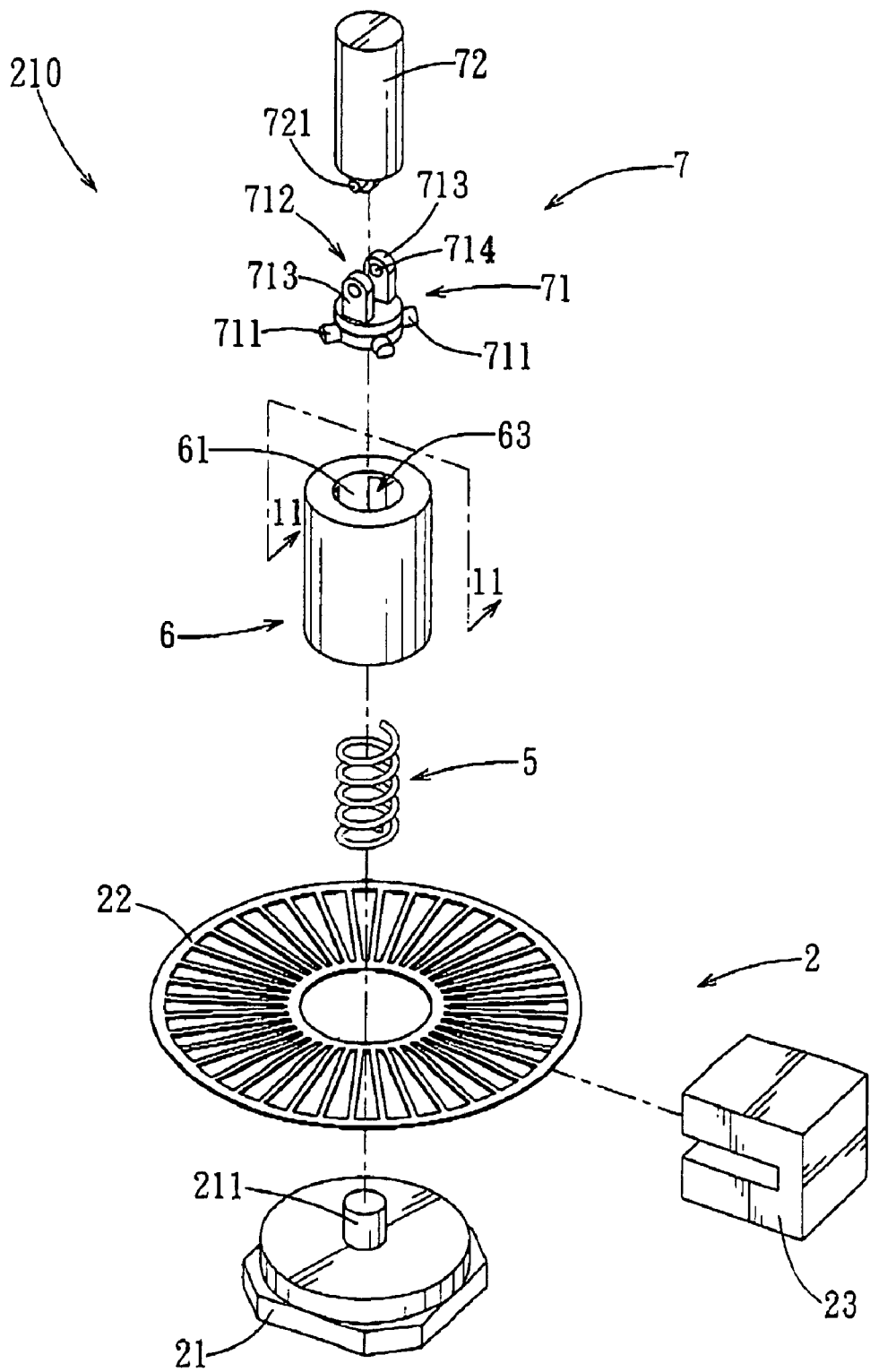
FIG. 10 is an exploded perspective view of the second preferred embodiment to illustrate assembly relationship among a sensor unit, a column, a joystick, and a resilient element.
Figure 11:
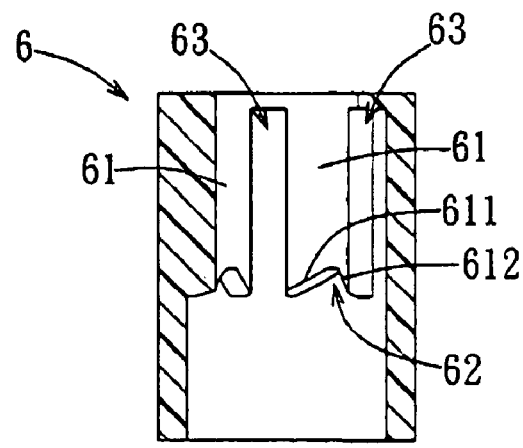
FIG. 11 is a sectional view of the column taken along line 11-11 of FIG. 10.
Figure 12:
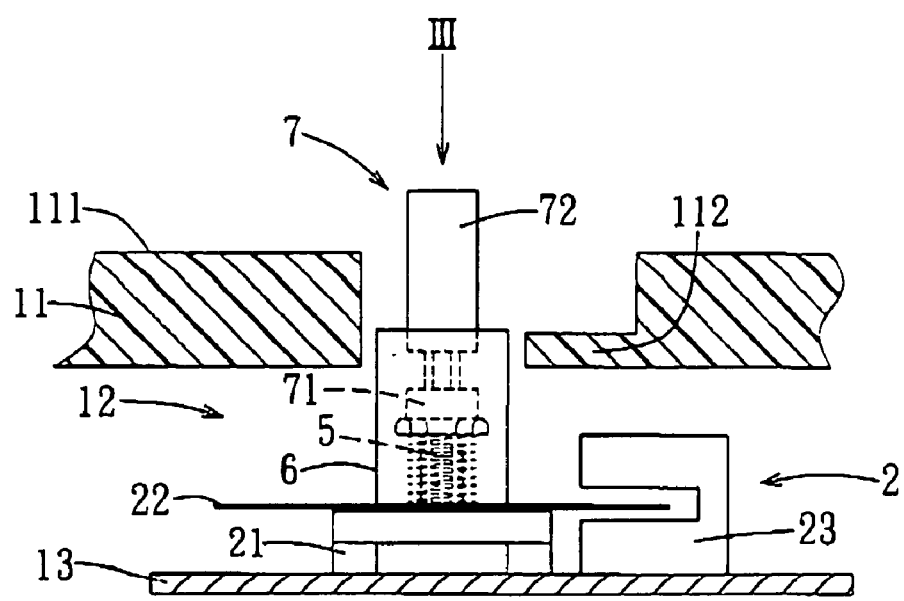
FIG. 12 is a side view of the second preferred embodiment mounted in a receiving space of the electronic equipment, illustrating the joystick at a first position relative to the column.

As shown in FIGS. 10, 11 and 12, the column 6 of the pointing device 210 is hollow and cylindrical, and includes a plurality of axially extending elongated ribs 61 angularly spaced apart on an inner surface of the column 6, a plurality of limiting recesses 62 defined respectively by the bottom ends of the ribs 61, and a plurality of axially extending elongated guide grooves 63. Each of the guide grooves 63 is formed between an adjacent pair of the ribs 61. The joystick 7 includes a mounting seat 71 extending into the column 6, and a rod 72 connected pivotally to a too end of the mounting seat 71. The mounting seat 71 has a plurality of limiting elements 711 in the form of studs angularly spaced apart on an cuter surface of the mounting seat 71, and a connecting member 712 provided on a top end thereof. The connecting member 712 includes two spaced-apart lugs 713. The rod 72 is connected pivotally to the mounting seat 71 by means of two protruding posts 721 (only one is visible in FIG. 10) at a bottom end thereof, which engage two pivot holes 714 formed respectively in the lugs 713, such that the rod 72 is pivotable relative to the mounting seat 71. In addition, the resilient element 5 is disposed within the column 6, and is the form of a compression spring having two ends respectively abutting against a bottom face of the mounting seat 71 and the base 21 of the sensor unit 2.

Figure 13:
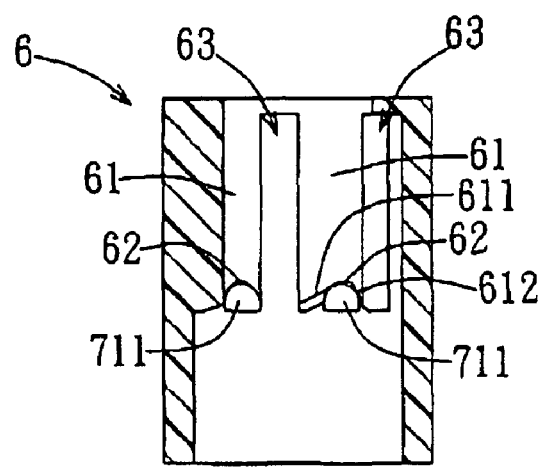
FIG. 13 is a schematic sectional view of the second preferred embodiment to illustrate how limiting elements are retained in limiting recesses in the column.

As shown in FIGS. 12 and 13, when the joystick 7 is at the first position, the mounting seat 71 of the joystick 7 is accommodated within the column 6, and compresses the resilient element 5 such that the latter deforms, the limiting elements 711 of the mounting seat 71 are respectively retained in the limiting recesses 62 in the column 6, and the rod 72 projects from the outer surface 111 of the casing 11 and is coaxial with the column 6. At this point, the mounting seat 71 of the joystick 7 is at a relatively low limit position, and the rod 72 is located at a position of use ready for operation by the user. The user can push the rod 72 of the joystick 7 with his/her finger to bring the column 6 to swing in any direction so as to control movement and position of a cursor on a display screen of the electronic equipment. In addition, the user can cause the mounting seat 71 to bring the column 6 to rotate in the direction indicated by arrow I (as shown in FIG. 9) or arrow II (as shown in FIG. 9) through rotating the rod 72 so as to control scroll bars on a web page to move up or down like using a roller wheel of the conventional mouse, or to control movement or positioning along a Z-axis direction in 3D software, thereby permitting input in another dimension using the pointing device 210.

Figure 14:
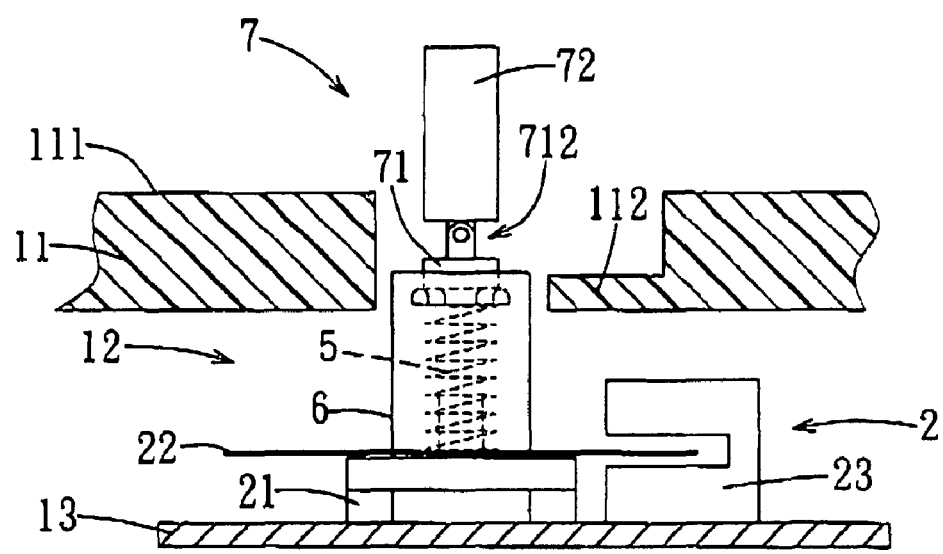
FIG. 14 is a side view of the second preferred embodiment mounted in the receiving space of the electronic equipment, illustrating how the joystick is rebounded to a relatively high position relative to the column.
Figure 15:
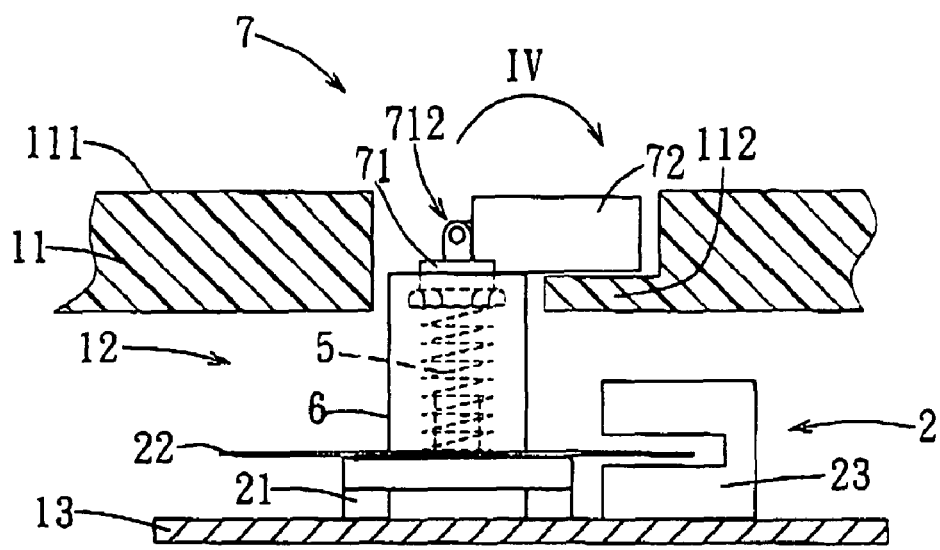
FIG. 15 is a side view of the second preferred embodiment mounted in the receiving space of the electronic equipment, illustrating the joystick at a second position relative to the column, and the joystick at an angle with the column.
Figure 16:
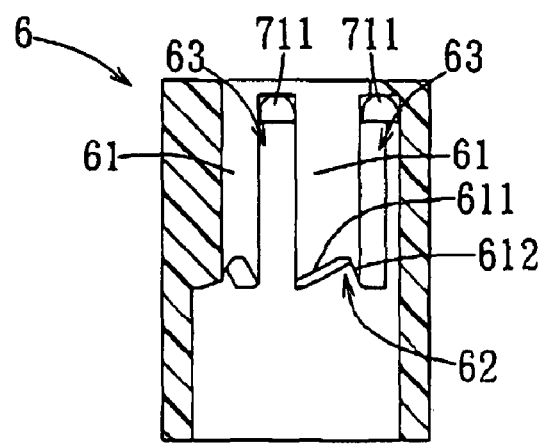
FIG. 16 is a schematic side view of the second preferred embodiment, illustrating how the limiting elements are retained in guide grooves in the column.

As shown in FIGS. 14, 5 and 16, when the user presses the rod 72 of the joystick 7 to move downward in the direction indicated by arrow III (see FIG. 12), the limiting elements 711 of the mounting seat 71 will be guided by second ramps 612 at the bottom ends of the ribs 61 to slide to the bottom ends of the guide grooves 63, whereas the mounting seat 71 of the joystick 7 will is simultaneously bring the rod 72 to rotate an angle relative to the column 6 in the direction indicated by arrow II (see FIG. 9) about the central axis thereof. When the user releases the pressure on the rod 72, the restoration force of the resilient element 5 will force the mounting seat 71 and the rod 72 of the joystick 7 to rebound to the positions shown in FIG. 14. Thus, the limiting elements 711 of the mounting seat 71 will be retained in the guide grooves 63 in the column 6, and the connecting member 712 on the top end of the mounting seat 71 will be exposed from the top end of the column 6. The user can then manipulate the rod 72 to cause the rod 72 to pivot relative to the mounting seat 71 in a direction indicated by arrow IV to the second position as shown in FIG. 15, such that the rod 72 is at an angle with the column 6, and is accommodated in the receiving space 12. The joystick 7 in this state is at a relatively high limit position.

In this embodiment, although the casing 11 is provided with a partition plate 112 against which the rod 72 can abut when at the second position, it should be apparent to those skilled in the art that the partition plate 112 is not essential as long as the receiving space 12 defined by the casing 11 permits the rod 72 to be accommodated therein and to be substantially flush with the outer surface 111 of the casing 11 after being pivoted relative to the mounting seat 71.

In addition, when the user wants to operate the joystick 7 once again, the rod 72 is manipulated to pivot in a direction opposite to the direction indicated by arrow IV to the position shown in FIG. 14. By pressing the rod 72 downwardly in the direction indicated by arrow III (see FIG. 12), the limiting elements 711 of the mounting seat 71 are brought to displace downward along the guide grooves 63. Thereafter, when the user releases the pressure on the rod 72, due to the restoration force of the resilient element 5 and the guiding of first ramps 611 at the bottom ends of the ribs 61, each of the limiting elements 711 of the mounting seat 71 is forced to slide along the respective first ramp 611 to an adjacent one of the limiting recesses 62. At the same time, the mounting seat 71 of the joystick 7 will bring the rod 72 to rotate an angle relative to the column 6 in the direction indicated by arrow II (see FIG. 9) about the central axis. The joystick 7 is thus restored to the position of use ready for operation by the user.

In sum, due to the configuration of the joystick 4, 7, the column 3, 6, and the resilient element 5 in the pointing device 200, 210 of the two preferred embodiments, the joystick 4, 7 can move between the first and second positions. The joystick 4, 7 is operable by the user when at the first position, and is stowable in the receiving space 12 when at the second position. Thus, inadvertent actuation of the joystick 4, 7 can be avoided when the user is carrying the electronic equipment, thereby enhancing the convenience of carrying the electronic equipment. In addition, by rotating the joystick 4, 7 to cause the same to rotate the column 3, 6 relative to the base 21 in the direction indicated by arrow I or arrow II, input in an additional dimension using the pointing device 200, 210 is possible.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A pointing device for electronic equipment, the electronic equipment including a casing and a receiving space defined by the casing, said pointing device comprising:
    a sensor unit adapted to be disposed in the receiving space;
    a column disposed on and swingable relative to said sensor unit, said sensor unit detecting swinging state of said column; and
    a joystick mounted on said column and movable relative to said column between first and second positions such that said joystick is adapted to project from an outer surface of the casing when at the first position and is adapted to be accommodated in the receiving space when at the second position, said joystick including a mounting seat having a top end and an outer surface, and a rod having a bottom end connected pivotally to said top end of said mounting seat, said mounting seat having a connecting member provided on said top end thereof for pivotal connection with said bottom end of said rod, said connecting member of said mounting seat being accommodated within said column and said rod being coaxial with said column when said joystick is at the first position, said connecting member of said mounting seat being exposed from a top end of said column when said joystick is at the second position such that said rod is pivotable relative to said mounting seat and is at an angle with said column so as to be adapted to be accommodated in the receiving space.

2. The pointing device according to claim 1, wherein the first position is a relatively low limit position, and the second position is a relatively high limit position.

3. The pointing device according to claim 2, wherein, when said joystick is moved upward from the first position to the second position, said joystick will simultaneously rotate relative to said column about a central axis thereof, and when said joystick is moved downward from the second position to the first position, said joystick will simultaneously rotate relative to said column about the central axis thereof.

4. The pointing device according to claim 3, further comprising a resilient element for providing a restoration force to restore said joystick from the first position to the second position.

5. The pointing device according to claim 4, wherein said column is hollow, has an inner surface, and includes a plurality of axially extending ribs angularly spaced apart or said inner surface of said column and having bottom ends, a plurality of limiting recesses defined respectively by said bottom ends of said ribs, and a plurality of axially extending guide grooves, each of said guide grooves being formed between an adjacent pair of said ribs, said joystick extending into said column and including a plurality of limiting elements angularly spaced apart on said outer surface of said joystick, said resilient element being in the form of a compression spring that is disposed in said column and that has two ends respectively abutting against said joystick and said sensor unit, said limiting elements being retained respectively in said limiting recesses when said joystick is at the first position, said limiting elements being retained respectively in said guide grooves when said joystick is at the second position.

6. The pointing device according to claim 5, wherein said limiting elements are disposed on said outer surface of said mounting seat.

7. The pointing device according to claim 1, wherein said sensor unit includes a base for mounting of said column and for detecting the swinging state of said column, said joystick bringing said column to rotate relative to said base about a central axis thereof when said joystick is at the first position.

8. The pointing device according to claim 7, wherein said base has a top face and includes a pivot pin provided on said top face of said base for mounting of said column, said column having an outer surface and being rotatable relative to said pivot pin about the central axis thereof, said sensor unit further including an optical grating fitted on said outer surface of said column, and a photo interrupter for detecting rotational state of said optical grating such that, when said joystick brings said column to rotate relative to said base about the central axis, said optical grating is rotatable with said column, and said photo interrupter detects the rotational state of said optical grating.

* * * * *